(12) United States Patent
Gibbs

(10) Patent No.: US 6,482,187 B1
(45) Date of Patent: Nov. 19, 2002

(54) ANIMAL IDENTIFICATION AND MEDICATION SYRINGE

(76) Inventor: Fred O. Gibbs, 1001 "O" St., Greeley, CO (US) 80631

( * ) Notice: Subject to any disclaimer, the term of this patent is extended or adjusted under 35 U.S.C. 154(b) by 108 days.

(21) Appl. No.: 09/694,885

(22) Filed: Oct. 23, 2000

(51) Int. Cl.⁷ .................. A61M 5/178; A61M 5/315
(52) U.S. Cl. ................................ 604/218; 604/130
(58) Field of Search ....................... 604/130, 134, 604/135, 137, 191, 189, 218, 82, 89

(56) References Cited

U.S. PATENT DOCUMENTS

| | | | | |
|---|---|---|---|---|
| 3,880,162 A | * | 4/1975 | Simmons | 604/197 |
| 3,881,360 A | * | 5/1975 | Jurado | 222/309 |
| 5,306,251 A | * | 4/1994 | Alexander | 604/130 |
| 5,437,641 A | * | 8/1995 | Cameron | 473/581 |
| 5,607,407 A | * | 3/1997 | Tolkoff et al. | 604/523 |
| 5,961,495 A | * | 10/1999 | Walters et al. | 604/111 |

* cited by examiner

Primary Examiner—Edward K. Look
Assistant Examiner—Kimya N McCoy
(74) Attorney, Agent, or Firm—Sheridan Ross P.C.

(57) ABSTRACT

An animal identification and medication syringe includes a barrel, a plunger piston which moves longitudinally within the barrel in response to air pressure within the barrel, and a syringe needle for penetrating the hide of an animal and for introducing medication into the animal. A valve mechanism or plug assembly enables the syringe to selectively deliver medication into the animal. The plunger piston evacuates the medication chamber within the barrel, and also acts as the force by which the syringe is ultimately ejected from the animal after medication has been delivered. A marking disk may be mounted on the distal end of the syringe to disinfect the needle and/or to mark the animal upon impact of the syringe with the animal. A rapid refill device is also provided to refill the syringe numerous times without having to disassemble or otherwise manipulate the syringe.

42 Claims, 6 Drawing Sheets

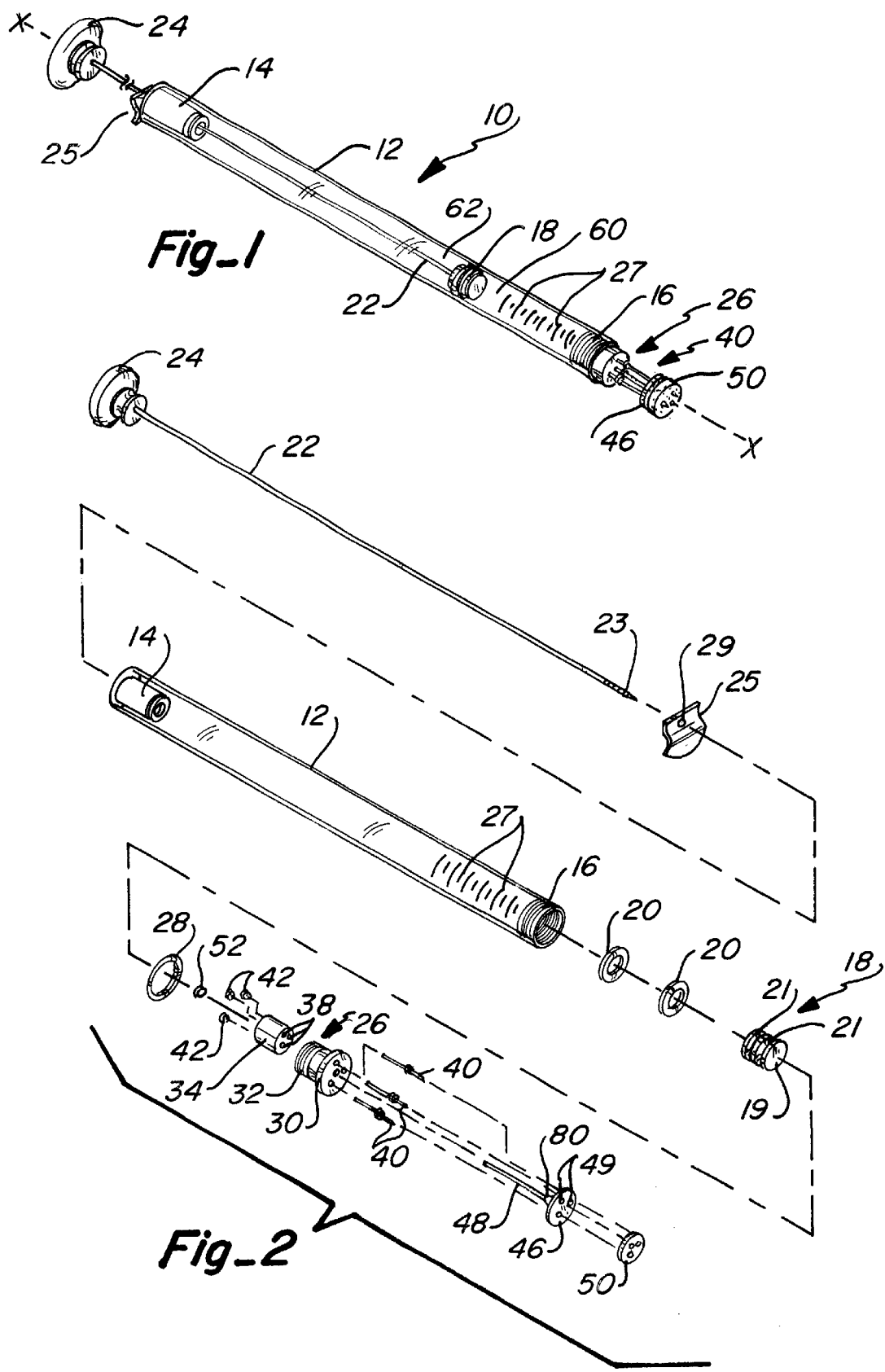

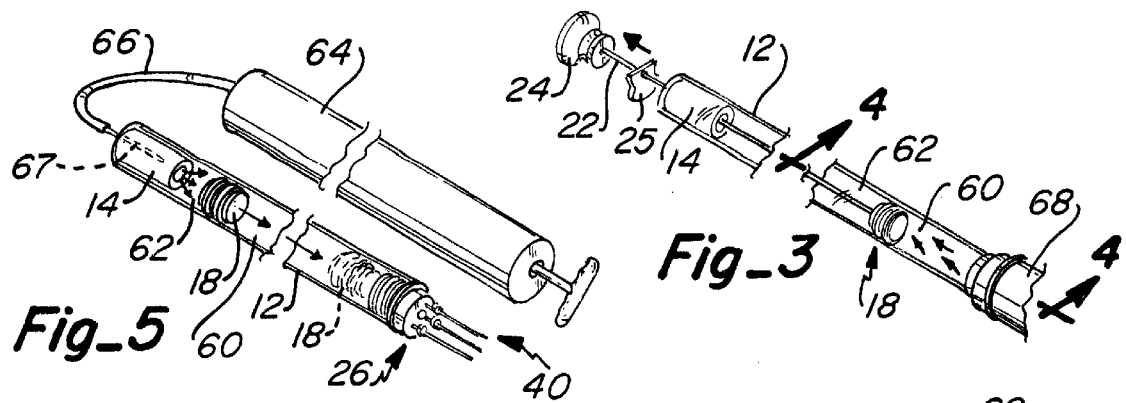
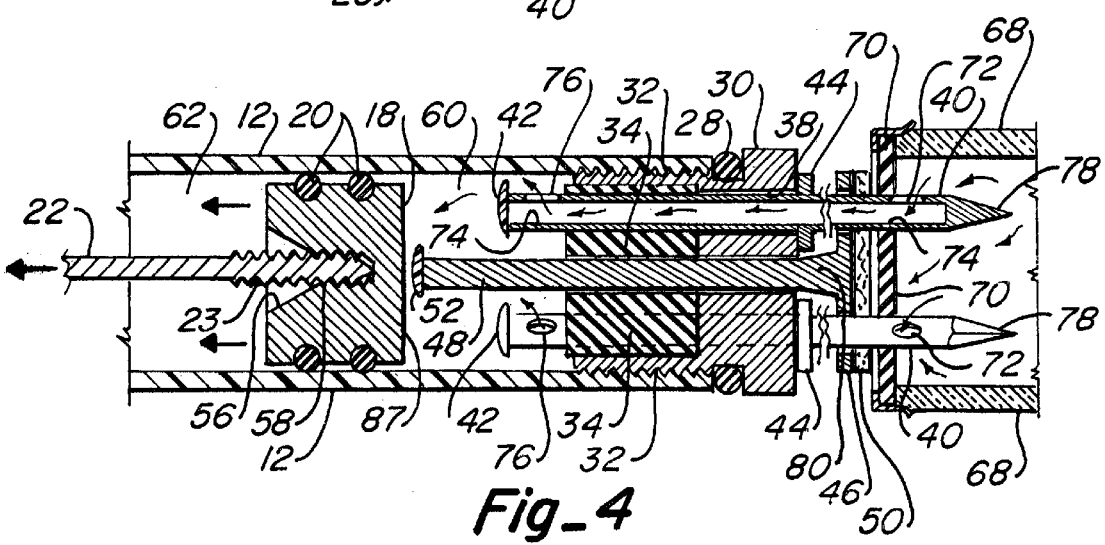
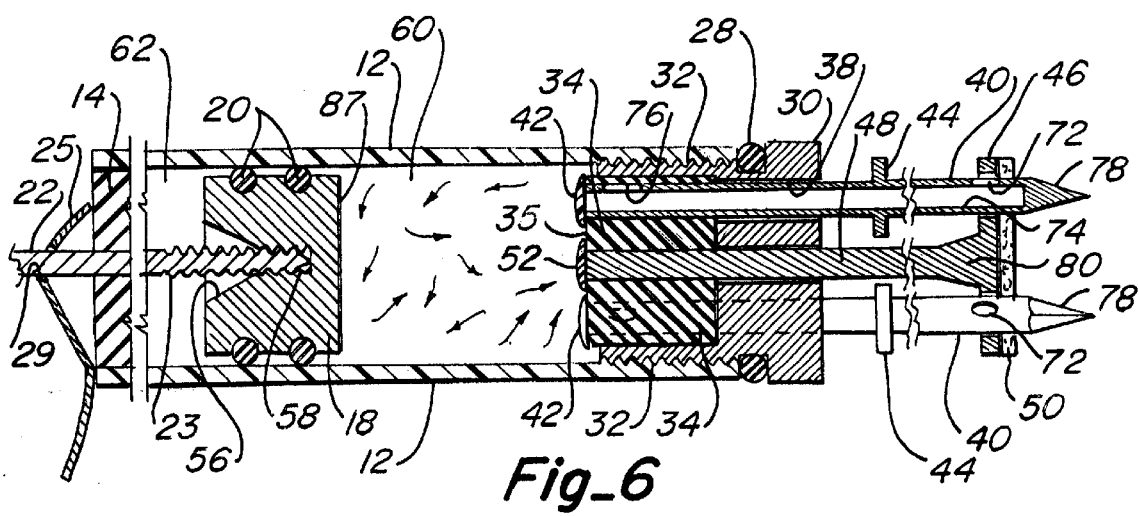

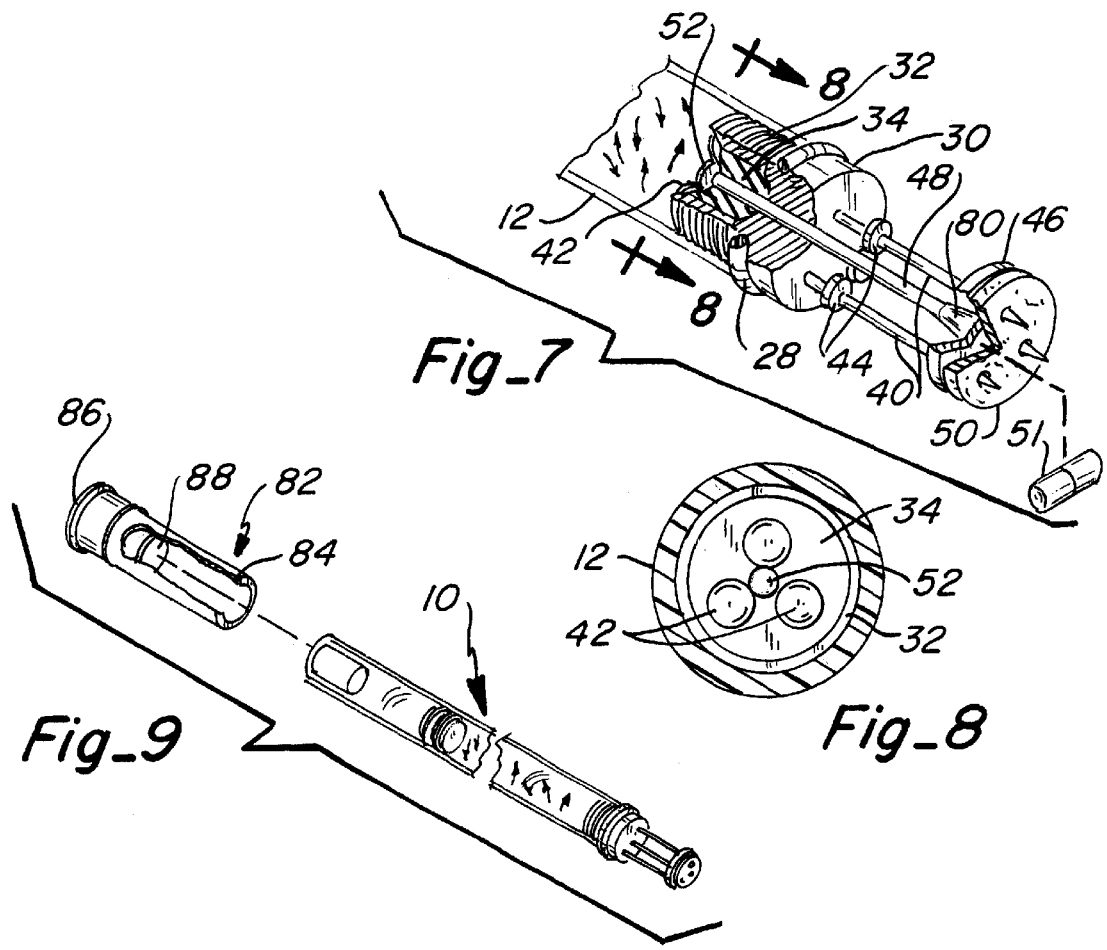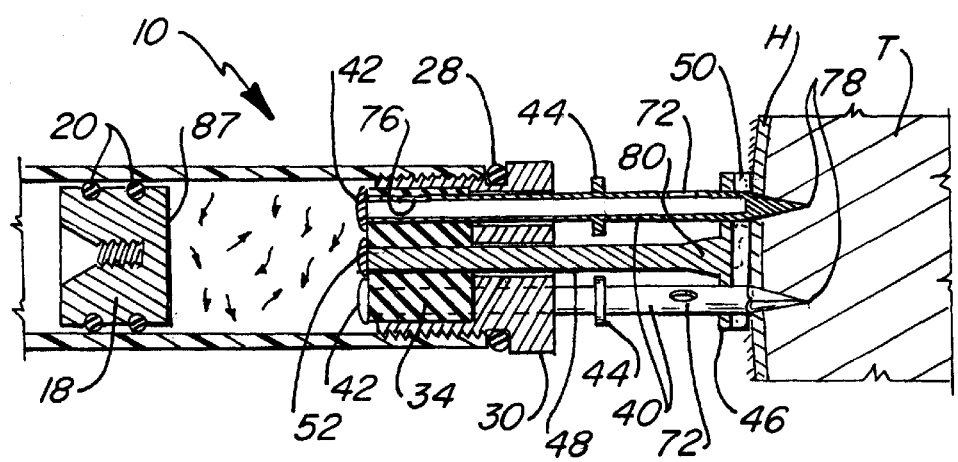

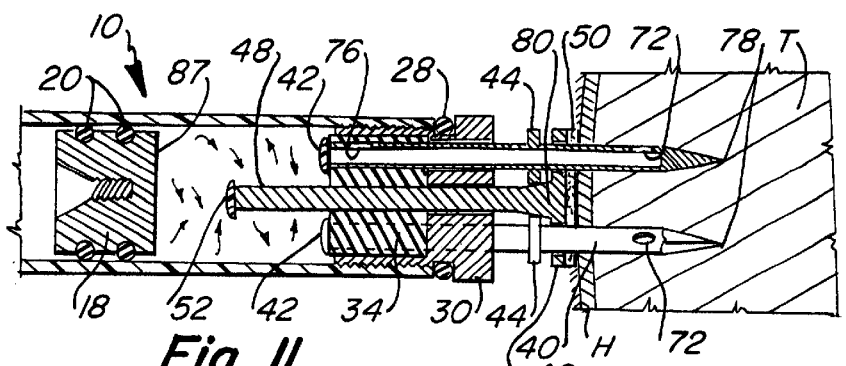
Fig_11
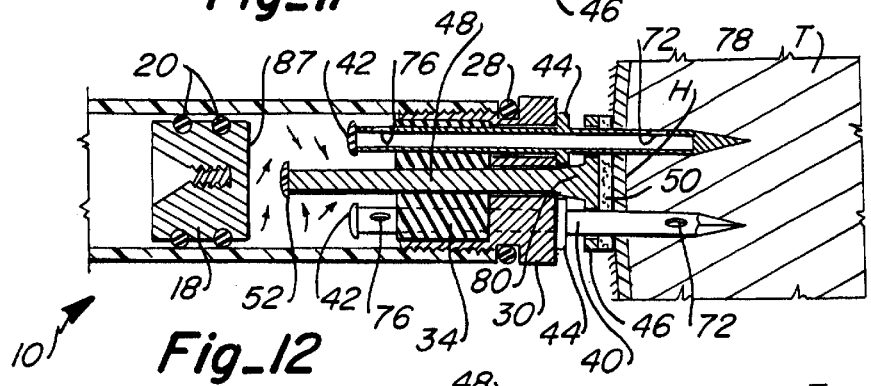
Fig_12
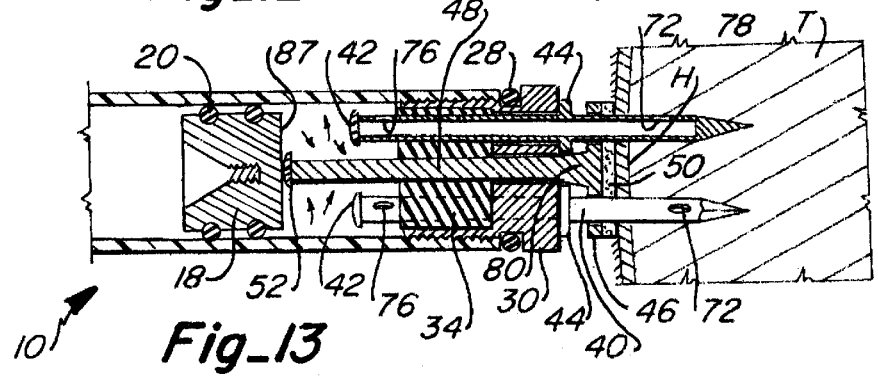
Fig_13
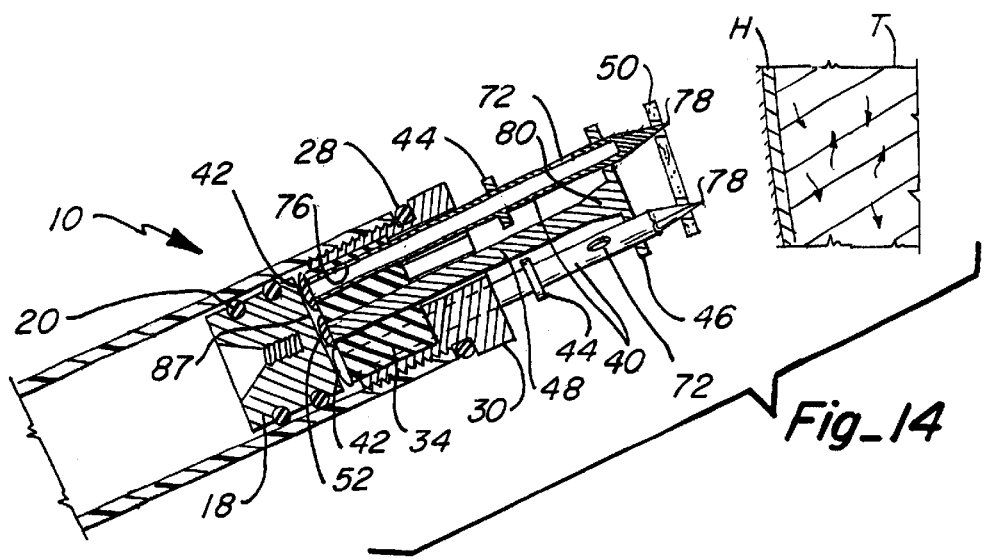
Fig_14

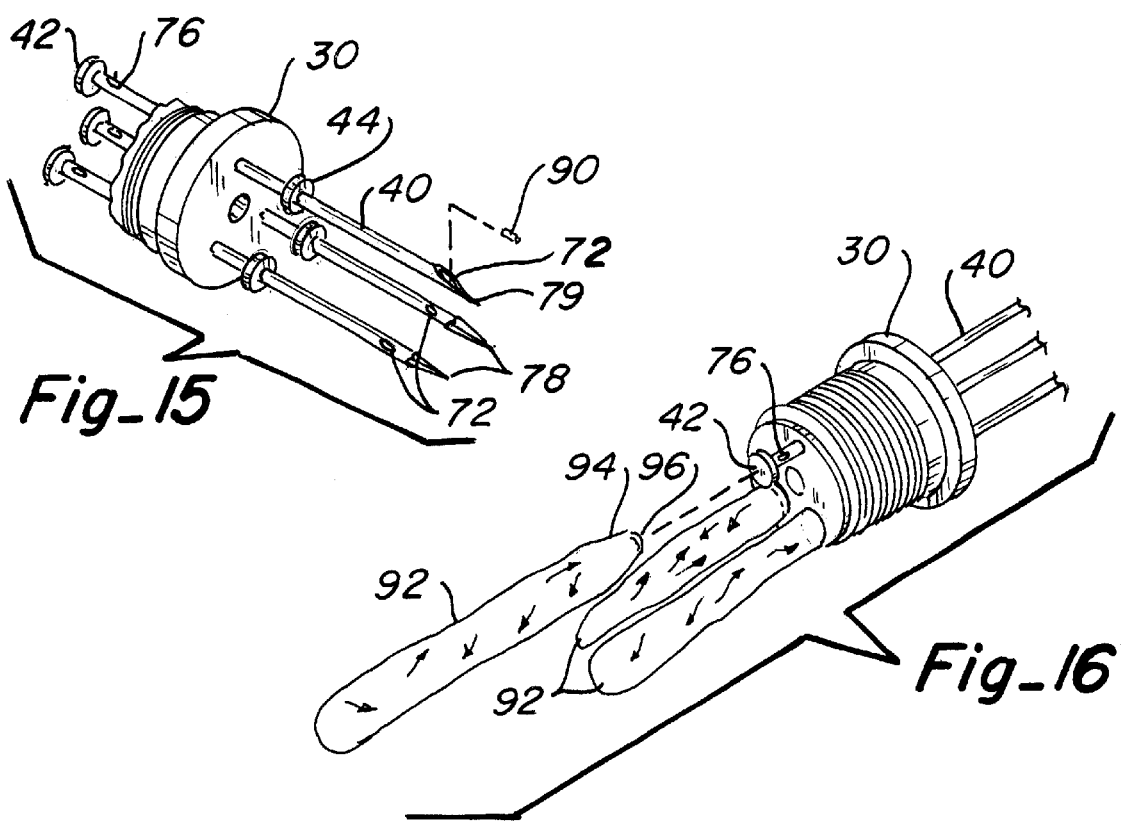

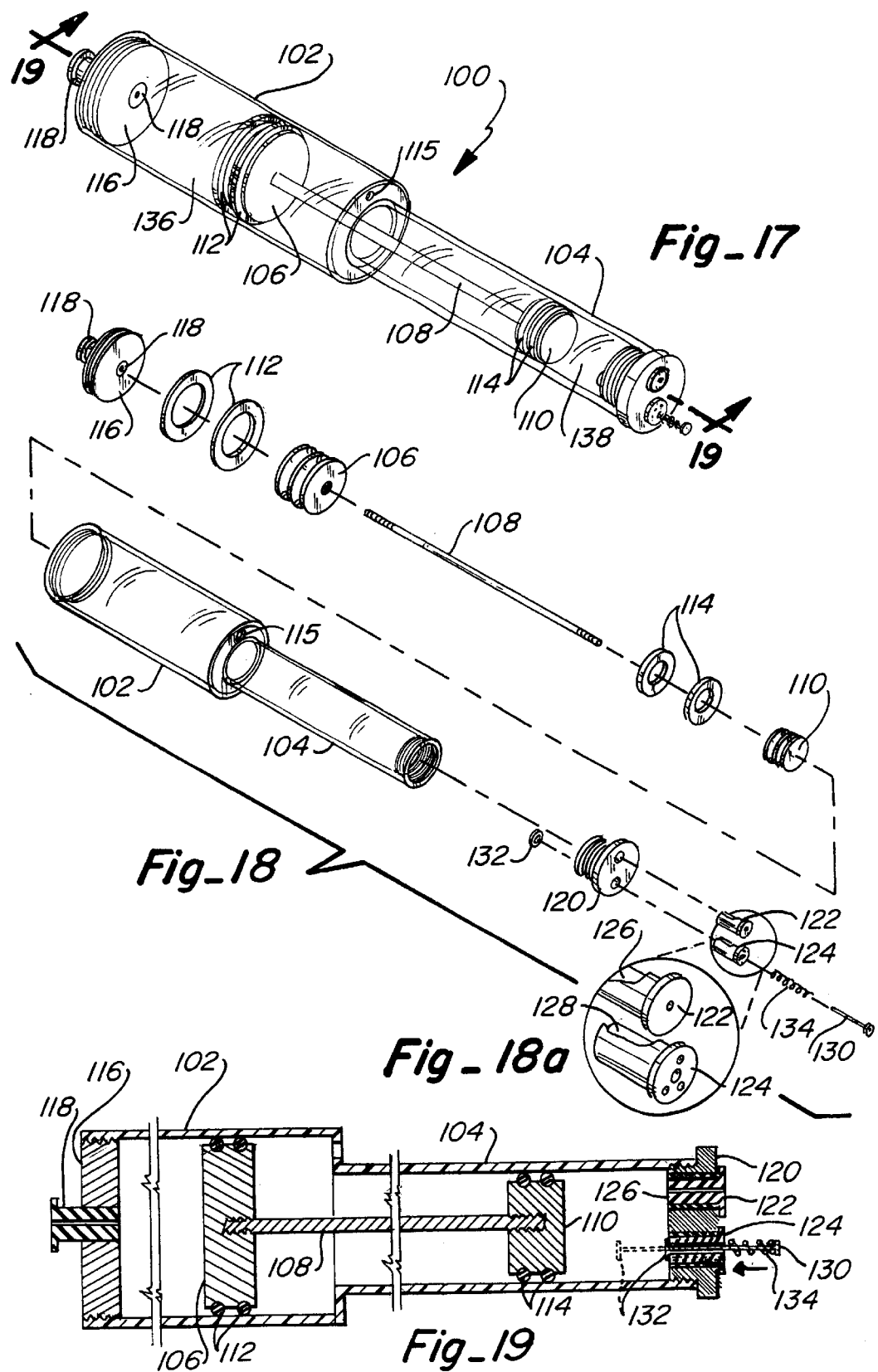

ANIMAL IDENTIFICATION AND MEDICATION SYRINGE

TECHNICAL FIELD

This invention relates to an injection apparatus in the form of a syringe which may be delivered as a projectile for contact with an animal and, more particularly, to an animal identification and medication syringe for marking, monitoring, and medication of domestic animals and wild life.

BACKGROUND OF THE INVENTION

A number of devices exist for injecting medication into animals and for marking and monitoring animals. Some of these devices treat animals by means of pole-mounted syringes or syringe-bearing projectiles that enable the user to medicate the animal from a safe distance. In addition to disposable or single use delivery systems, there are also devices which enable the delivery systems to be retrieved from the animal for reuse. For example, for those syringes which are shot through a gun for delivery of the medication, string retrieval systems are available which enable the user to retrieve the syringe by the connected string/line.

There are a number of disadvantages to pole-mounted syringes or other systems which require the user to come close enough to the animal to contact the animal with the syringe. That is, even with the pole-mounted syringe, the user is at close quarters with the animal which can endanger the user. Many of the syringe-bearing missile systems utilizing string retrieval are difficult to retrieve as such strings may become entangled with the animal itself or surrounding objects.

One example of a syringe which is delivered as a projectile for medicating an animal is U.S. Pat. No. 5,437,641. This invention also discloses a means by which the syringe is ejected from the animal once medication is delivered to the animal.

Another example of a projectile type syringe includes U.S. Pat. No. 3,715,990. This invention discloses a dart projectile with a cylinder mechanism for discharging medication upon impact. Within the cylinder is a plunger piston enclosing an explosive charge. Impact fires the explosive charge, thereby moving the plunger piston and causing the medication to pass through the syringe into the animal.

Although the foregoing inventions may be adequate for their intended purposes, a tremendous need still exists in domestic and wild life animal medicine for a syringe that can be shot through the air to deliver large or small volumes of medication to a distant target with pinpoint accuracy while simultaneously marking the target animal for future identification. A further need exists for this syringe to be lightweight, durable, compact, reusable, easily disinfected, and capable of penetrating both thick and thin hides with ease. Additionally, it is desirable that the impact of the syringe against the animal cause minimal tissue damage, and that the syringe be easily manipulated to allow one or more different types of medication to be delivered simultaneously, along with selected quantities of each of the medications.

The invention disclosed below meets each of these needs, as fully explained in connection with the below description of the invention and the accompanying drawings.

SUMMARY OF THE INVENTION

In accordance with the present invention, an animal identification and medication syringe is provided. In its simplest form, the syringe includes a barrel, a plunger piston which moves longitudinally within the barrel in response to air pressure within the barrel, and a syringe needle for penetrating the hide of an animal and for introducing medication into the animal. The distal end of the barrel includes a valve mechanism or needle plug assembly which enables the plug assembly to either prevent the flow of medication through the needle, or to allow flow of medication through the needle depending upon the position of the barrel with respect to the needle. The plunger piston separates the interior opening of the barrel into an air pressure chamber, and a medication chamber. In use, the medication chamber is filled with a desired quantity and type of medication. Air pressure is then introduced into the air pressure chamber thus forcing the plunger piston against the medication within the medication chamber. The needle is positioned initially so that the needle plug assembly prevents flow of medication through the needle. Once the device impacts the animal, the syringe is moved forward or distally which allows medication to flow through the needle into the animal. The air pressure within the air pressure chamber forces the plunger piston in the distal or forward direction thus evacuating or emptying the contents of the medication chamber through the syringe needle into the animal. Means are provided in the form of a pressure reacting member for forcing the needle in a proximal or rearward direction once the medication chamber is emptied through the needle. Thus, once the plunger piston moves to its most forward or distal position emptying the medication chamber, the needle is then forced in the proximal direction causing the needle to be ejected from the hide of the animal.

The preferred embodiment of this invention may include one or more needles. The needle plug assembly may be adapted for preferably one to three needles. One advantage of multiple needles is reduced trauma to the animal because the size of each of the multiple needles may be smaller, thus avoiding a relatively large and invasive puncture made by a single larger diameter needle. Additionally, use of multiple needles provides greater gripping capability in terms of the syringe remaining attached to the animal while medication is delivered. Also, a multiple needle device can allow the separate injection of different medications simultaneously with the same impact to the animal. As well understood, the physical mixing of medications prior to actual delivery to the animal is most oftentimes undesirable.

In the preferred embodiment, the specific structure of the invention includes a hollow cylindrical barrel with a proximal barrel plug at the proximal end of the barrel, and the needle plug assembly positioned at the opposite or distal end of the barrel. The plunger piston is slidable within the hollow opening of the barrel in response to air pressure which is introduced into the barrel through proximal barrel plug. The needle plug assembly acts as a valve which determines whether medication can flow through one or more needles which are secured within the needle plug assembly. Each of the needles used with the device of this invention includes a proximal opening, a distal opening, and a central passageway extending between the proximal and distal openings. Prior to the syringe being delivered to the animal, each needle is placed such that the proximal needle openings are covered by the needle plug assembly. Once the medication chamber has been filled, and the plunger piston is pressing against the medication chamber due to air pressure within the air pressure chamber, the syringe can be delivered as a projectile to the animal. As the needle(s) enter the hide of the animal, the forward or distal movement of the barrel causes the needle plug assembly to slide forward over the needle(s)

uncovering the proximal needle openings, thus allowing the medication to flow through the proximal needle openings, through the central passageways, and out the distal needle openings into the tissue of the animal. A needle disk shaft which is positioned in the medication chamber and which extends in the proximal direction is contacted with the plunger piston as the plunger piston moves forward or distally to evacuate the medication chamber. A needle disk which is rigidly connected to the distal end of the needle disk shaft is pressed against the hide of the animal upon impact. The syringe is forced away from the animal once the plunger piston moves to its most distal position, causing the needle (s) to be removed from the animal. The needle disk shaft and needle disk may comprise the pressure reacting member. Although a needle disk can be used, it shall be understood that the needle disk can simply be the distal end of the needle disk shaft, the distal end being large enough so as not to penetrate the hide of the animal.

A marking/disinfecting disk is mounted over the needle disk adjacent the distal tips of the needle(s). As the barrel moves forward upon impact with the animal, the marking/ disinfecting disk swipes the portions of the needle(s) which eventually penetrate the hide of the animal. This contact allows the needles to be disinfected by contact with the disinfecting/marking disk which may be dipped or soaked with a disinfectant solution. Additionally, the marking/ disinfecting disk can be soaked in a dye solution which enables the animal to be easily marked or tagged upon impact by the syringe.

Various types of needle tips can be used. One particularly advantageous needle tip arrangement includes a trochar point. The trochar point tip comprises a triangular point consisting of three flat cutting surfaces. This trochar point allows a needle to cut through even the toughest, thickest hides with much less force than conventional needles. As the needle penetrates deeper into the hide of the animal, the diameter of the needle increases thereby wedging itself into the small hole originally cut by the small trochar tip. Thus, the needle is better retained within the animal, and a minimal amount of medication is lost after ejection of the needle away from the animal.

A swedge or enlarged portion on the needle disk shaft causes a slight spread of the needles once they have penetrated the animal. This feature further ensures that the syringe needles stay within the animal during medication delivery.

Also provided herein is a rapid refill syringe mechanism. This refill mechanism enables syringes to be rapidly refilled with a desired medication. The refill mechanism is similar to the syringe of this invention in that the refill mechanism also includes a barrel, and a piston which separates the barrel into an air pressure chamber and a medication chamber. A plug is provided at the proximal end of the refill mechanism which allows air to be introduced into the air chamber. Medication fills the medication chamber. In order to refill a syringe, a needle of the syringe is inserted into a needle plug insert, and the fluid within the medication chamber is then forced through the syringe needle into the medication chamber of the syringe. The filling mechanism may have a plurality of needle plug inserts adapted to receive single or multiple syringe needle arrangements.

Additional advantages will become apparent from the description which follows, taken in conjunction with the accompanying drawings.

BRIEF DESCRIPTION OF THE DRAWINGS

FIG. 1 is perspective view of a preferred embodiment of the syringe of this invention;

FIG. 2 is an exploded perspective view of the syringe of this invention;

FIG. 3 is a fragmentary perspective view illustrating one method by which the medication chamber of the syringe can be filled;

FIG. 4 is a fragmentary vertical cross section taken along line 4—4 of FIG. 3 illustrating interior details of the invention and, specifically, the syringe placed so that the proximal needle openings are uncovered, and the method of filling the medication chamber in accordance with FIG. 3;

FIG. 5 is another fragmentary perspective view of the syringe of this invention illustrating the air chamber being pressurized by the introduction of air therein causing the plunger piston to move forward against the medication contained within the medication chamber;

FIG. 6 is another fragmentary vertical cross section taken along line 4—4 of FIG. 3, illustrating the syringe needles placed so that the proximal needle openings are covered by the needle plug, illustrating the plunger piston placing pressure on the medication chamber, and further illustrating a plunger stop placed in a locked position;

FIG. 7 is an enlarged fragmentary perspective view of the syringe further showing interior details of the same;

FIG. 8 is a vertical section taken along line 8—8 of FIG. 7;

FIG. 9 is a fragmentary perspective view of the syringe and a fragmentary perspective view of a propellant in the form of a modified shotgun shell;

FIG. 10 is a greatly enlarged vertical cross section illustrating an animal which has been initially contacted by a syringe;

FIGS. 11–14 are greatly enlarged vertical cross sections illustrating the operation of the syringe as the needles of the syringe penetrate the animal, the medication delivery, and further how the syringe ejects itself from the animal after delivery of medication and marking;

FIG. 15 is another greatly enlarged fragmentary perspective view of the syringe illustrating an animal identification/monitoring chip which may be embedded in the animal during the contact of the syringe with the animal;

FIG. 16 is another enlarged fragmentary perspective view illustrating flexible medication containers which may be used to deliver different types of medication simultaneously with the same syringe impact;

FIG. 17 is a perspective view of a rapid syringe filling mechanism which may be used to rapidly refill numerous syringes;

FIG. 18 is an exploded perspective view of the refill mechanism;

FIG. 18a is a greatly enlarged fragmentary perspective view of some components of the mechanism; and FIG. 19 is an enlarged vertical section taken along line 19—19 of FIG. 17 illustrating interior details of the mechanism.

DETAILED DESCRIPTION OF THE DRAWINGS

FIG. 1 illustrates the animal identification and medication syringe of this invention. The major components of the invention include a cylindrical barrel 12 having a proximal barrel plug 14, a plunger piston 18 which slides within the opening of the barrel, a needle plug assembly 26 secured to the distal end of the barrel 12, and one or more needles 40 which are secured within the needle plug assembly 26. The barrel 12 and needle(s) 40 extend along longitudinal axis X—X.

The proximal barrel plug 14 is similar to a bladder used on an inflatable ball. The bladder 14 seals the proximal end of the barrel, but allows the needle of an inflation device (FIG. 5) to penetrate the barrel plug for introducing air into the barrel 12. The plug 14 also allows the plunger rod 22 to be inserted therethrough, yet preventing air from escaping through the barrel plug.

As shown in FIG. 2, the plunger piston 18 includes a body portion 19 with one or more peripheral grooves 21 formed thereon. O-rings 20 fit over the grooves 21. The O-rings 20 are sized such that with an adequate amount of pressure, the plunger piston 18 can be moved axially or longitudinally within the barrel opening, yet isolate the opening of the barrel into two sealed sides or chambers.

The plunger rod 22 can be used to manipulate the positioning of the plunger piston 18 within the barrel opening. As shown, the plunger rod 22 is inserted through the proximal barrel plug 14 and the distal threaded end 23 connects to the rear or proximal side of the piston 18. The user then grasps the plunger handle 24 and pushes or pulls to move the plunger piston, as further discussed below. Also, a plunger stop 25 can be mounted over the plunger rod 22. The plunger stop 25 is used to lock or hold the plunger 22 against the proximal end of the barrel 12 at a desired position as determined by the user, as further discussed below. Gradations or markings 27 may be placed on the barrel to indicate the amount of medication within the barrel.

FIG. 2 also illustrates the needle plug assembly 26 in further detail, along with other adjacent components. As shown, the needle plug assembly 26 has a threaded portion 32 which mates with the threaded distal end 16 of the barrel 12. A needle plug cap 30 is provided and which forms an integral or single component along with the threaded portion 32. The threaded portion 32 has an opening which receives a resilient plug 34. The plug 34 may be rubber, or other well-known resilient materials. An O-ring 28 is positioned between the distal threaded end 16 of the barrel, and the proximal or rear edge of the needle plug cap 30 ensuring a tight seal of the needle plug assembly 26 over the barrel 12. One or more needle plug passageways 38 are formed through the plug 34. These passageways 38 are best seen in FIGS. 5 and 6. One or more needles 40 are inserted through openings in the needle plug cap 30, and through the corresponding passageways 38. The proximal ends of the needles 40 are provided with needles caps 42 which prevent the needles 40 from being pulled back through the passageways 38. The needle caps 42 thus limit the distal travel of the needle plug 26 over the needles 40. The needles 40 are also provided with needle stops 44 which resemble flanges or protrusions, and are formed on the needles 40 between the proximal and distal ends thereof These needle stops 44 are positioned distally of the cap 30 and thus limit the proximal or rearward travel of the needle plug assembly over the needles. A needle disk/pressure reacting member 46 has attached thereto in perpendicular fashion a needle disk shaft 48. The shaft 48 is inserted through another opening in the needle plug cap 30, and a corresponding passageway 38 in the resilient plug 34. Preferably, the needle disk shaft 48 is centered between the needles 40. The needle disk shaft 48 extends through the corresponding passageway 38 in the plug 34 such that the proximal end of the shaft 48 resides within the opening of the barrel 12. A needle disk shaft stop 52 attaches to the proximal end of the shaft 48, thus limiting the distal travel of needle plug assembly 26 over the shaft 48 and disk 46. A plurality of needle disk openings 49 are provided on the needle disk 46 which allows the distal ends of the needles 42 to protrude therethrough. A circular shaped marking/disinfecting disk 50 is mounted over the distal or forward surface of the needle disk 46. The marking/disinfecting disk 50 may be made of an absorptive material, such as felt, providing it absorbent characteristics for absorbing a disinfectant solution, a colored dye, or any other solution which may be used to mark and/or disinfect.

Now referring to FIGS. 4 and 6, further interior details of the syringe of this invention are shown. The distal threaded end 23 of the plunger rod 22 is secured to the plunger piston 18 by inserting the threaded end 23 through cone-shaped opening 56, and then screwing the threaded end 23 into threads 58. Also shown are the O-rings 20 which provide a effective seal, thus isolating the opening of the barrel into two separate chambers of sides. The forward or distal side of the barrel defines the medication chamber 60, and the rear or proximal side of the barrel opening defines the air chamber 62.

FIGS. 4 and 6 also illustrate the interior details of the needles 40. As shown, each needle includes a distal needle opening 72, a central passageway 74, and a proximal needle opening 76. One method in which medication can be introduced into the medication chamber 60 is shown in FIGS. 3 and 4. As shown, a medication container 68 may include a medication container cap 70. The needles 40 are inserted through the cap 70. The user then pulls rearwardly on plunger handle 24, thus creating a vacuum within medication chamber 60. When the needles are in the position as shown in FIG. 4, medication is allowed to be drawn through distal needle opening 72, through passageways 74, and into the medication chamber 60 through proximal needle opening 76. FIG. 4 shows the needles wherein the proximal openings 76 are uncovered from the needle plug assembly. The needles 40 can be moved to cover the proximal needle openings 76, as shown in FIG. 6, by the resilient plug 34. Thus, medication can be trapped within the medication chamber 60. With appropriate applied force, the needles 40 are slidable to cover or uncover the openings 76. The contact between the needles 40 and the interior walls of passageways 38 must be tight enough to ensure a tight seal once the needles are covered. Depending upon the type of medicine container cap 70, the mere act of pulling back on the syringe away from the medicine container might allow the needles 40 to be pulled back to cover openings 76. Otherwise, the needles could be manually pulled by a pair of tongs, or some other sterile grasping device. As shown in FIG. 5, an air pump 64 can be used to deliver compressed air into the air chamber 62. As shown, a standard air pump 64 would include an air pump hose 66 and an inflation needle 67 which would penetrate the barrel plug 14 allowing air to be introduced. Introduction of air into the air chamber 62 causes the plunger piston 18 to be forced against the medication within the medication chamber 60. Prior to adding air to the air chamber 62, the needles 40 would be placed in the position of FIG. 6 to cover openings 76. If the air chamber 62 were pressurized and the user had a need to manipulate the plunger piston 18, the plunger stop 25 could be used to hold the plunger piston 18 at the desired position. As shown in FIG. 6, the plunger stop 25 resembles a stop which may be used on a closing device of a door. An irregular-sized opening 29 on the plunger stop 25 allows the plunger stop 25 to be wedged against the rear or proximal end of the barrel 12.

FIGS. 7 and 8 illustrate the needle plug assembly 26, the needles 40, and the needle disk 46 and needle disk shaft 48. As shown, the distal tips of the needles 40 are covered by the marking/disinfecting disk 50 when the needles are in the most forward or distal position with respect to the needle plug assembly 26 and the needle disk 46 is at its most distal or forward position. As shown in FIG. 8, the needle caps 42 and the shaft stop or cap 52 abut the rear or proximal surface 35 of the resilient plug 34.

Referring to FIG. 7 again, in lieu of or in addition to the marking/disinfecting disk 50, a very small gelatin capsule 51 containing a colored dye or other marking agent can be wedged between the distal tips of the needles 40. This capsule 51 can be used to mark the animal upon the impact of the syringe. That is, upon impact, the capsule 51 would be crushed between the needle disk 46 and the animal's hide, thus marking the animal. In order to wedge the capsule 51 between the needles 40, the needle disk 46 would be shifted to a more proximal position, thus exposing a greater length of the distal ends of the needles 40. The marking/disinfecting disk 50 could then be used to at least disinfect the proximal portions of the needles 40 swiped with the disk upon impact. Alternatively, the marking/disinfecting disk 50 could be removed and only the capsule 51 would be used for marking purposes.

As shown in FIG. 9, the syringe of this invention may be propelled or shot at an animal by the use of a pole, bow, crossbow, air gun, or shot at an animal by use of a standard shotgun or other weapon of choice. As shown in FIG. 9, a modified shotgun shell 82 is provided with a standard shell casing 84, and shell cap 86. The distal closed end of the standard shell is removed along with the pellets, thus leaving an open shell casing 84. The proximal or rear end of the barrel would then be inserted within the shell casing 84 and placed against the seat 88.

Because of its aerodynamic shape and its distributed and balanced weighting, the syringe may be shot at the targeted animal over a considerable distance. Of course, selection of the shell 82 would ensure that the syringe would be shot with enough force to cause the needles 40 to penetrate the hide of the animal, but otherwise to ensure minimal damage of the syringe upon impact with the animal.

FIGS. 10–14 illustrate the functioning of the syringe after it makes contact with the animal. As shown in FIG. 10, upon impact, the distal ends of the needles 40 penetrate the hide H of the animal, and enter the tissue T. With this forward or distal travel, the needles 40 are swiped with the disinfecting/marking disk 50, which helps to disinfect the needles. Simultaneous with this forward movement of the needles 40, the needle disk 46 is wedged against the animal's hide H, allowing the barrel 12 to continue to move forward due to kinetic energy remaining from travel of the syringe. As shown in FIG. 11, the needles 40 have moved to their deepest penetration in the animal's tissue T. However, the proximal needle opening 76 are still covered by the plug 34 preventing flow of medication into the animal. As shown in FIG. 12, the barrel 12 continues its distal or forward travel, thus exposing the proximal needle openings 76 to medication chamber 60. At this point, medication is allowed to flow through the needles 40 and into the tissue T of the animal. It should be understood that the time it takes for the syringe to proceed through the steps shown in FIGS. 10–12 is nearly instantaneous. That is, the needles 40 make initial penetration through the hide H of the animal, the needles make full penetration into the animal, and the needle disk 46 becomes wedged on the animal's hide allowing the barrel 12 to move forward to expose the proximal needle openings 76, all within a fraction of a second.

As shown in FIG. 12, because the air chamber 62 is pressurized, the plunger piston 18 moves in the distal direction as the medication is evacuated from the medication chamber 60. As shown in FIG. 13, the forward or distal side 87 of the piston 18 as it continues its forward travel eventually makes contact with the shaft stop 52 of shaft 48. The plunger piston 18 continues to move in the distal direction which, in turn, forces the barrel 12 in the proximal or rearward direction since the shaft 48 is wedged between the distal side 87 of piston 18 and the needle disk 46. The proximal or rearward travel of the barrel 12 causes the proximal needle openings 76 of the needles 40 to be covered by plug 34, and further causes the needles to be extracted from the tissue T of the animal. As shown in FIG. 14, the syringe then falls away from the animal. Also, because of the initial impact of the disk 50 with the animal, a mark or print is left, thus marking the animal for future identification.

The syringe may then be used over again as desired by the user. In such a case, the medication chamber 60 would be refilled with the desired medication, the air chamber 62 pressurized again, and the syringe then shot at another animal. As necessary, the syringe can be disinfected by removing the needle plug assembly, and soaking the syringe and its components in a disinfectant solution.

Preferably, the barrel is made of a polycarbonate or plastic material. The needle plug cap 30 and threaded portion 32 are preferably made of aluminum. The needles 40 are preferably made of stainless steel, as is the case for most injection-type needles. Additionally, it is preferable that the body portion 19 of the plunger piston, along with the needle disk 46 and the needle disk shaft 48, be made of aluminum.

It shall be understood that another simple way in which to add medication to the medication chamber would be to unscrew the needle plug assembly 26, pour the medication into the medication chamber, and then reattach the needle plug assembly. Then the air chamber 62 could be pressurized.

FIGS. 10 and 11 also illustrate one feature of the invention which allows the needles 40 to be better retained within the animal. As shown in FIG. 10, when the needles 40 make initial penetration into the animal, there is a small gap between the needle stops 44 and the enlarged needle shaft swedge or swedge portion 80 which is situated at the connection point between the needle disk 46 and the needle disk shaft 48. As shown in FIGS. 12 and 13, as the barrel 12 moves to the fullest distal or forward position, the interior edges of the needle stops 44 make contact with the needle shaft swedge 80, thus slightly forcing the needles 40 outwardly or transversely with respect to the longitudinal axis of the barrel. This slight spread of the needles 40 helps to ensure that the needles remain within the animal during the medication process. As the needles are withdrawn from the animal, the needle stops 44 are removed from contact with the needle shaft swedge 80, thus returning the needles to their normal position and allowing the needles to be more easily removed.

Although a multiple needle arrangement has been shown in the preferred embodiment, it shall be understood that a single needle can be used. One advantage of using a multiple needle arrangement is that smaller diameter needles can be used which result in less trauma to the animal, as opposed to using a single larger diameter needle. Also, a multiple needle arrangement better grips or holds the animal's tissue which ensures full evacuation of the medication chamber, and improves the retention time in which the syringe is engaged with the animal.

It should also be understood that there are different types of needle tips which may be used in the preferred embodiment of this invention. Two examples are shown in FIG. 15.

One type of needle point may include a trochar point 78, as discussed above. The distal needle opening 72 is situated on the body of the needle adjacent the trocar point 78. Alternatively, a more standard type of needle tip may be used, shown as needle tip 79. The distal needle opening 72 for tip 79 is simply the open distal end. Additionally, it is within the spirit and scope of this invention to also deliver not only medication, but also identification/monitoring chips during the injection process. As shown, a small animal identification or marking/monitoring chip 90 may be placed within the distal end of the needle tip 79, thus allowing the chip 90 to be imbedded within the tissue of the animal during the injection process. As understood by those skilled in the art, such chips 90 have become popular for electronically tagging both wild and domestic animals. Such chips also have the capability to monitor body function parameters such as heart rate, blood pressure, temperature, respiration rate, blood sugar, $CO_2$, and others.

FIG. 16 shows an additional feature of the preferred embodiment wherein a plurality of separate medication containers 92 can be used to deliver different types of medication simultaneously with a single impact to the animal. As shown, the medication containers 92 are simply flexible containers carrying desired types of medication or media. The medication containers have a narrowed section 94, and a collar 96 which would fit snugly over the needles 40, just distally of the proximal needle openings 76. In the first or closed position, the narrowed section 94 would be withdrawn into the needle plug passageways 38. In the second or open position, medication within the containers 92 are evacuated through the needles 40 as the plunger piston 18 compresses the medication containers 92.

FIG. 17 illustrates a rapid syringe filling mechanism which can be used to fill the syringe of this invention multiple times. As shown, the filling mechanism 100 includes an air receiving barrel 102, and a transfer barrel 104. A plunger piston 106 is situated in the opening of the barrel 102, and is slidable within the barrel 102 in same manner as the plunger piston 18. A transfer piston 110 is provided within the transfer barrel 104, and is also slidable within the transfer barrel 104 in the same manner as piston 18. A rigid piston rod 108 interconnects the piston 106 to the piston 110. As desired, O-rings 112 and 114 are provided to ensure a good seal between the interior surfaces of the barrels 102/104 and the pistons 106/110. An air pressure chamber 136 is defined as the space to the rear or proximally of the piston 106, while the opening in transfer barrel 104 to the front or distally of transfer piston 110 defines a medication chamber 138. An air vent hole 115 is provided to enable air to freely escape from and be drawn into the openings in the barrels 102 and 104 between the pistons 106 and 110. A threaded end cap 116 is provided on the proximal end of the air receiving barrel 102. The end cap 116 further includes a rear plug 118, which is similar to the proximal barrel plug 14. A threaded needle cap 120 is provided to cover the open distal end of the transfer barrel 104. One or more needle plug inserts 122 and 124 are provided on the needle cap 120. The needle plug inserts 122 and 124 function similarly to the needle plug assembly 26. As shown in FIG. 18a, the needle plug inserts 122 and 124 each have rubber or resilient plugs/bladders 126 and 128, similar to plug 34.

When it is desired to rapidly refill the syringe 10 of this invention, the medication chamber 138 is first filled with the desired medication. Medication can be introduced into the chamber 138 by simply unscrewing the needle cap 120. The diameter of transfer barrel 104 is much larger then the diameter of the barrel 12, thus allowing storage of a much larger amount of medication within the medication chamber 138 allowing refill of numerous syringes. If the syringe has a single needle configuration, a single needle 40 would simply be inserted through the needle plug insert 122, exposing the distal needle opening 72 to the medication chamber 138. The air pressure chamber 136 is pressurized in the same manner as air chamber 62, thus urging the pistons 106 and 110 in the distal direction. This pressure allows the medication to be transferred from the medication chamber 138, through the needle 40 and into the medication chamber 60 of the syringe. In a multiple needle configuration of the syringe, the multiple needles 40 would be inserted through the needle plug insert 124 which has openings matching the particular needle configuration. Thus, the syringe again can be refilled by transfer of medication from the medication chamber 138, through the multiple needles 40, and into the medication chamber 60. The magnification of the pressure due to the difference in size of air pressure chamber 136 to the medicine chamber 138 can be approximately 2.5 to 1. For example, a 40 p.s.i. pressure in the air chamber results in 100 p.s.i. pressure in the medicine chamber. In the practice, this magnification has been found to be acceptable; however, it shall be understood that this particular magnification can be altered as desired depending upon the particular use of the rapid syringe filling mechanism.

In order to prevent leakage of medication within the medication chamber 138 when the air chamber 136 is pressurized, a sliding pin 130 and attached pin cap 132 are provided to block travel of medication through the passageways or openings through plugs 126 and 128. As best seen in FIG. 19, a spring or resilient member 134 is mounted over the exposed end of sliding pin 130. This spring 134 urges the pin 130 in the distal direction, thus causing the pin cap 132 to cover the openings of plugs 126 and 128. In the multiple needle arrangement, the needle disk 46 would contact the distal end of the pin 130, thus forcing the sliding pin 130 in the proximal direction and removing the pin cap 132 from covering the openings of the plugs 126 and 128. Also, it shall be understood that plugs 126 and 128 could be of the self-sealing bladder types, such as the type of plug which is used with the proximal barrel plug 14. However, this type of plug is more difficult to disinfect, and may have to be replaced upon each disinfection cycle of the syringe mechanism 100.

This invention has been described in detail with reference to particular embodiments hereof, but it will be understood that various other modifications can be effected within the spirit and scope of this invention.

What is claimed is:

1. A syringe comprising:

a syringe barrel having a longitudinal axis and an opening extending longitudinally therethrough, said barrel further having a proximal end and a distal end;

a barrel plug positioned at said proximal end of said syringe barrel;

a needle plug positioned at said distal end of said syringe barrel and remaining stationary in relation to the syringe barrel;

a plunger piston placed within said opening of said barrel and movable longitudinally within said barrel opening between said barrel plug and said needle plug, said plunger piston dividing said barrel opening into an air pressure chamber and a medicine chamber;

at least one needle attached to said needle plug, said at least one needle having a passageway enabling flow of medication therethrough, and being aligned with said syringe barrel along said longitudinal axis;

a pressure reacting member positioned adjacent said at least one needle, said pressure reacting member enabling said barrel to be movable longitudinally in response to pressure placed on said pressure reacting member from impact with an animal and in response to pressure placed on said pressure reacting member from said plunger piston;

wherein said at least one needle is first placed such that said needle plug prevents flow of medication through said at least one needle, and said needle plug being slidable over said needle in response to distal travel of said barrel thereby exposing said passageway and allowing medication to flow through said passageway, and into tissue of an animal.

2. A device, as claimed in claim 1, wherein:

said at least one needle passageway further includes a proximal needle opening and a distal needle opening.

3. A device, as claimed in claim 1, wherein:

said at least one needle includes at least a pair of needles, each needle of said at least a pair of needles having a proximal needle opening, a distal needle opening, and a needle passageway interconnecting said proximal and distal openings, each said. needle being secured within said needle plug.

4. A device, as claimed in claim 2, wherein:

said at least one needle has a cylindrical outer surface and a trocar point formed on a distal end of said cylindrical outer surface, said distal needle opening being placed adjacent said trocar point on said cylindrical outer surface such that medication passing through said needle flows out of said distal needle opening transversely from said longitudinal axis of said at least one needle.

5. A device, as claimed in claim 1, further including:

an electronic marking/monitoring device placed within said passageway wherein said identification device becomes embedded within the tissue of the animal by the flow of medication from said at least one needle.

6. A device, as claimed in claim 1, wherein said pressure reacting member includes:

a needle disk shaft secured in said needle plug, and a needle disk attached to a distal end of said needle disk shaft.

7. A device, as claimed in claim 6, wherein:

said shaft includes a swedge portion formed thereon and positioned near said needle disk wherein said swedge contacts said at least one needle to cause said at least one needle to move in a transverse direction away-from alignment of the at least one needle along said longitudinal axis, thus enhancing the ability of the at least one needle to remain within the tissue of the animal as medication is injected into the animal.

8. A device, as claimed in claim 1, further including:

a plunger rod insertable through said proximal barrel plug, and engageable with said plunger piston to selectively move said plunger piston longitudinally within said barrel opening.

9. A device, as claimed in claim 8, further including:

a plunger stop communicating with said plunger rod and said proximal end of said barrel enabling said plunger piston to be held at a desired position within said barrel opening.

10. A device, as claimed in claim 1, further including:

a flexible medication container placed within said medicine chamber of said barrel opening, and connected to said at least one needle enabling medication within said flexible medication container to be evacuated through said at least one needle and into the tissue of the animal.

11. A device, as claimed in claim 1, wherein:

said at least one needle includes a plurality of needles, and said device further includes a plurality of flexible medication containers placed within said medicine chamber of said barrel opening, and connected to corresponding ones of said plurality of needles enabling medication within said plurality of flexible medication containers to be individually and separately evacuated through said corresponding plurality of needles and into the tissue of the animal.

12. A device, as claimed in claim 1, further including:

a marking/disinfecting disk mounted adjacent said pressure reacting member and communicating with said at least one needle to mark the animal upon impact of the syringe with the animal and/or to disinfect the at least one needle by contact of the at least one needle with said disk prior to entry of said at least one needle into the animal.

13. A device, as claimed in claim 1, further including:

a proximal needle cap covering said proximal end of said at least one needle, and for limiting distal travel of said needle plug over said at least one needle.

14. A device, as claimed claim 1, wherein:

said passageway of said at least one needle further includes a proximal needle opening, and a distal needle opening; and wherein said at least one needle is placed such that said proximal needle opening is covered by said needle plug preventing the flow of medication through said at least one needle, and said needle plug being slidable over said at least one needle such that said proximal needle opening is uncovered from said needle plug allowing medication to flow through said proximal needle opening, through said passageway and out said distal needle opening into the tissue of the animal.

15. A rapid refill syringe device for refilling a syringe, said device comprising:

a barrel having a proximal end, a distal end, and an opening extending therethrough;

a rear cap connected to said proximal end of said barrel;

a needle cap connected to said distal end of said barrel;

a plunger piston positioned in said barrel and movable longitudinally within said barrel opening;

at least one needle plug insert mounted within said needle cap, said needle plug insert having at least one opening for receiving a needle of the syringe therethrough; and wherein said plunger piston separates said barrel opening into an air pressure chamber and a medication chamber, said air chamber being pressurized urging said plunger piston in a distal direction toward said medicine chamber.

16. A device, as claimed in claim 15, further including:

a sliding pin having a proximal and distal end, said sliding pin being attached to said needle plug insert and slidable longitudinally therein, said sliding pin further including a pin cap attached to said proximal end of said sliding pin; and a biasing means communicating with said sliding pin urging said sliding pin in the distal direction to cause said pin cap to contact said needle plug insert and to close access to said at least one needle opening of said needle plug.

17. A syringe comprising:
a syringe barrel having a closed proximal end, a closed distal end, and an opening extending between said proximal end and said distal end, said syringe barrel extending along a longitudinal axis;
means for dividing said opening into an air pressure chamber and a medication chamber, said means for dividing being slidable in said opening along said longitudinal axis;
a needle plug positioned at said distal end of said barrel and remaining stationary in relation to said barrel;
at least one needle attached to said distal end of said barrel, said barrel being movable between a first covered position in contact with said needle plug preventing flow of medication through said needle from said medication chamber, and a second uncovered position in contact with said needle plug allowing flow of medication through said needle from said medication chamber; and
means for forcing said at least one needle in a proximal direction along said longitudinal axis in response to distal travel of said means for dividing within said opening.

18. A device, as claimed in claim 17, wherein:
said means for forcing includes a needle disk positioned adjacent at least one needle, and a shaft connected to said needle disk.

19. A device, as claimed in claim 17, wherein:
said at least one needle includes at least a pair of needles, each needle of said at least pair of needles being spaced from one another and slidably attached to said distal end of said barrel.

20. A device, as claimed in claim 17, wherein:
said at least one needle has a cylindrical outer surface and a trocar point formed on a distal end of said cylindrical outer surface.

21. A device, as claimed in claim 17, further including:
an electronic marking/monitoring device placed within said at least one needle for delivery to an animal.

22. A device, as claimed in claim 17, wherein:
said means for forcing includes a swedge portion formed thereon for contacting said at least one needle and to cause said at least one needle to be displaced transversely from said longitudinal axis.

23. A device, as claimed in claim 17, further including:
a plunger rod insertable through said proximal end of said barrel and engageable with said means for dividing to selectively move said means for dividing within said opening of said barrel.

24. A device, as claimed in claim 17, further including:
a flexible medication container placed within said medicine chamber of said syringe barrel, and connected to said at least one needle enabling medication within said flexible medication container to be evacuated through said at least one needle and into an animal.

25. A device, as claimed in claim 17, further including:
a marking/disinfecting disk mounted adjacent said means for forcing.

26. A device, as claimed in claim 17, wherein:
said at least one needle includes a plurality of needles, and said device further includes a plurality of flexible medication containers placed within said medicine chamber of said barrel opening, and connected to corresponding ones of said plurality of needles enabling medication within said plurality of flexible medication containers to be individually and separately evacuated through said corresponding plurality of needles and into the tissue of the animal.

27. A syringe comprising:
a syringe barrel having a longitudinal axis and an opening extending longitudinally therethrough, said barrel further having a proximal end and a distal end;
a barrel plug positioned at said proximal end of said syringe barrel;
a needle plug positioned at said distal end of said syringe barrel;
a plunger piston placed within said opening of said barrel and movable longitudinally within said barrel opening between said barrel plug and said needle plug, said plunger piston dividing said barrel opening into an air pressure chamber and a medicine chamber;
at least a pair of needles attached to said needle plug, each needle of said at least a pair of needles having a proximal needle opening, a distal needle opening, and a needle passageway interconnecting said proximal and distal openings enabling flow of medication therethrough;
a pressure reacting member positioned adjacent said pair of needles, said pressure reacting member enabling said barrel to be movable longitudinally in response to pressure placed on said pressure reacting member from impact with an animal and in response to pressure placed on said pressure reacting member from said plunger piston; and
wherein said at least a pair of needles is first placed such that said needle plug prevents flow of medication through said at least-a pair of needles, and said needle plug being slidable over said needles in response to distal travel of said barrel allowing medication to flow through said passageway, and into tissue of an animal.

28. A syringe comprising:
a syringe barrel having a longitudinal axis and opening extending longitudinally therethrough, said barrel further having a proximal end and a distal end;
a barrel plug positioned at said proximal end of said syringe barrel;
a needle plug positioned at said distal end of said syringe barrel;
a plunger piston placed within said opening of said barrel and movable longitudinally within said barrel opening between said barrel plug and said needle plug, said plunger piston dividing said barrel opening into an air pressure chamber and a medicine chamber;
at least one needle attached to said needle plug, said at least one needle having a passageway enabling flow of medication therethrough, and being aligned with said syringe barrel along said longitudinal axis;
a pressure reacting member positioned adjacent said at least one needle, said pressure reacting member enabling said barrel to be movable longitudinally in response to pressure placed on said pressure reacting member from impact with an animal and in response to pressure placed on said pressure reacting member from said plunger piston; a needle disk shaft secured in said needle plug, and a needle disk attached to a distal end of said needle disk shaft;
said needle disk shaft including a swedge portion formed thereon and positioned near said needle disk wherein said swedge contacts said at least one needle to cause said at least one needle to move in a transverse direction away from alignment of the at least one needle along said longitudinal axis, thus enhancing the ability of the at least one needle to remain within the tissue of the animal as medication is injected into the animal; and wherein said at least one needle is first placed such that said needle plug prevents flow of medication through said at least one needle, and said needle plug being slidable over said needle in response to distal travel of said barrel allowing medication to flow through said passageway, and into tissue of an animal.

29. A syringe comprising:

a syringe barrel having a longitudinal axis and opening extending longitudinally therethrough, said barrel further having a proximal end and a distal end;

a barrel plug positioned at said proximal end of said syringe barrel;

a needle plug positioned at said distal end of said syringe barrel;

a plunger piston placed within said opening of said barrel and movable longitudinally within said barrel opening between said barrel plug and said needle plug, said plunger piston dividing said barrel opening into an air pressure chamber and a medicine chamber;

at least one needle attached to said needle plug, said at least one needle having a passageway enabling flow of medication therethrough, and being aligned with said syringe barrel along said longitudinal axis;

a pressure reacting member positioned adjacent said at least one needle, said pressure reacting member enabling said barrel to be movable longitudinally in response to said pressure placed on said pressure reacting member from impact with an animal and in response to pressure placed on said pressure reacting member from said plunger piston;

a plunger rod insertable through said proximal barrel plug, and engageable with said plunger piston to selectively move said plunger piston longitudinally within said barrel opening;

a plunger stop communicating with said plunger rod and said proximal end of said barrel-enabling said plunger piston to be held at a desired position within said barrel opening; and wherein said at least one needle is first placed such that said needle plug prevents flow of medication through said at least one needle, and said needle plug being slidable over said needle in response to distal travel of said barrel allowing medication to flow through said passageway, and into tissue of an animal.

30. A syringe comprising:

a syringe barrel having a longitudinal axis and opening extending longitudinally therethrough, said barrel further having a proximal end and a distal end;

a barrel plug positioned at said proximal end of said syringe barrel;

a needle plug positioned at said distal end of said syringe barrel;

a plunger pistons placed within said opening of said barrel and movable longitudinally within said barrel opening between said barrel plug and said needle plug, said plunger piston dividing said barrel opening into an air pressure chamber and a medicine chamber;

at least one needle attached to said needle plug, said at least one needle having a passageway enabling flow of medication therethrough, and being aligned with said syringe barrel along said longitudinal axis;

a pressure reacting member positioned adjacent said at least one needle, said pressure reacting member enabling said barrel to be movable longitudinally in response to said pressure placed on said pressure reacting member from impact with an animal and in response to pressure placed on said pressure reacting member from said plunger piston;

a flexible medication container placed within said medicine chamber of said barrel opening, and connected to said at least one needle enabling medication within said flexible medication container to be evacuated through said at least one needle and into the tissue of the animal; and wherein said at least one needle is first placed such that said needle plug prevents flow of medication through said at least one needle, and said needle plug being slidable over said needle in response to distal travel of said barrel allowing medication to flow through said passageway, and into tissue of an animal.

31. A syringe comprising:

a syringe barrel having a longitudinal axis and opening extending longitudinally therethrough, said barrel further having a proximal end and a distal end;

a barrel plug positioned at said proximal end of said syringe barrel;

a needle plug positioned at said distal end of said syringe barrel;

a plunger piston placed within said opening of said barrel and movable longitudinally within said barrel opening between said barrel plug and said needle plug, said plunger piston dividing said barrel opening into an air pressure chamber and a medicine chamber;

at least one needle attached to said needle plug, said at least one needle having a passageway enabling flow of medication therethrough, and being aligned with said syringe barrel along said longitudinal axis;

a pressure reacting member positioned adjacent said at least one needle, said pressure reacting member enabling said barrel to be movable longitudinally in response to said pressure placed on said pressure reacting member from impact with an animal and in response to pressure placed on said pressure reacting member from said plunger piston;

said at least one needle further includes a plurality of needles, and said device further includes a plurality of flexible medication containers placed within said medicine chamber of said barrel opening, and connected to corresponding ones of said plurality of needles enabling medication within said plurality of flexible medication containers to be individually and separately evacuated through said corresponding plurality of needles and into the tissue of the animal; and wherein said at least plurality of needles are first placed such that said needle plug prevents flow of medication through said plurality of needles, and said needle plug being slidable over said needles in response to distal travel of said barrel allowing medication to flow through said passageway, and into tissue of an animal.

32. A syringe comprising:

a syringe barrel having a longitudinal axis and opening extending longitudinally therethrough, said barrel further having a proximal end and a distal end;

a barrel plug positioned at said proximal end of said syringe barrel;

a needle plug positioned at said distal end of said syringe barrel;

a plunger piston placed within said opening of said barrel and movable longitudinally within said barrel opening between said barrel plug and said needle plug, said plunger piston dividing said barrel opening into an air pressure chamber and a medicine chamber;

at least one needle attached to said needle plug, said at least one needle having a passageway enabling flow of medication therethrough, and being aligned with said syringe barrel along said longitudinal axis;

a pressure reacting member positioned adjacent said at least one needle, said pressure reacting member enabling said barrel to be movable longitudinally in response to said pressure placed on said pressure reacting member from impact with an animal and in response to pressure placed on said pressure reacting member from said plunger piston;

a proximal needle cap covering said proximal end of said at least one needle, and for limiting distal travel of said needle plug over said at least one needle; and wherein said at least one needle is first placed such that said needle plug prevents flow of medication through said at least one needle, and said needle plug being slidable over said needle in response to distal travel of said barrel allowing medication to flow through said passageway, and into tissue of an animal.

33. A syringe comprising:

a syringe barrel having a closed proximal end, a closed distal end, and an opening extending between said proximal end and said distal end, said syringe barrel extending along a longitudinal axis;

means for dividing said opening into an air pressure chamber and a medication chamber, said means for dividing being slidable in said opening along said longitudinal axis;

at least one needle attached to said distal end of said barrel, said barrel being movable between a first position preventing flow of medication through said needle from said medication chamber, and a second position allowing flow of medication through said needle from said medication chamber;

means for forcing said at least one needle in a proximal direction along said longitudinal axis in response to distal travel of said means for dividing within said opening; and said at least one needle further includes at least a pair of needles, each needle of said at least pair of needles being spaced from one another and slidably attached to said distal end of said barrel.

34. A syringe comprising:

a syringe barrel having a closed proximal end, a closed distal end, and an opening extending between said proximal end and said distal end, said syringe barrel extending along a longitudinal axis;

means for dividing said opening into an air pressure chamber and a medication chamber, said means for dividing being slidable in said opening along said longitudinal axis;

at least one needle attached to said distal end of said barrel, said barrel being movable between a first position preventing flow of medication through said needle from said medication chamber, and a second position allowing flow of medication through said needle from said medication chamber;

means for forcing said at least one needle in a proximal direction along said longitudinal axis in response to distal travel of said means for dividing within said opening; and said means for forcing includes a swedge portion formed thereon for contacting said at least one needle and to cause said at least one needle to be displaced transversely from said longitudinal axis.

35. A syringe comprising:

a syringe barrel having a closed proximal end, a closed distal end, and an opening extending between said proximal end and said distal end, said syringe barrel extending along a longitudinal axis;

means for dividing said opening into an air pressure chamber and a medication chamber, said means for dividing being slidable in said opening along said longitudinal axis;

at least one needle attached to said distal end of said barrel, said barrel being movable between a first position preventing flow of medication through said needle from said medication chamber, and a second position allowing flow of medication through said needle from said medication chamber;

means for forcing said at least one needle in a proximal direction along said longitudinal axis in response to distal travel of said means for dividing within said opening; and a flexible medication container placed within said medicine chamber of said syringe barrel, and connected to said at least one needle enabling medication within said flexible medication container to be evacuated through said at least one needle and into an animal.

36. A syringe comprising:

a syringe barrel having a closed proximal end, a closed distal end, and an opening extending between said proximal end and said distal end, said syringe barrel extending along a longitudinal axis;

means for dividing said opening into an air pressure chamber and a medication chamber, said means for dividing being slidable in said opening along said longitudinal axis;

at least one needle attached to said distal end of said barrel, said barrel being movable between a first position preventing flow of medication through said needle from said medication chamber, and a second position allowing flow of medication through said needle from said medication chamber; and means for forcing said at least one needle in a proximal direction along said longitudinal axis in response to distal travel of said means for dividing within said opening; and said at least one needle further includes a plurality of needles, and said device further includes a plurality of flexible medication containers placed within said medicine chamber of said barrel opening, and connected to corresponding ones of said plurality of needles enabling medication within said plurality of flexible medication containers to be individually and separately evacuated through said corresponding plurality of needles and into the tissue of the animal.

37. A method of injecting medication into an animal, said method comprising the steps of:

providing a syringe including a barrel, a needle plug positioned at a distal end of said barrel, a plunger piston slidably mounted within said barrel dividing the barrel into an air pressure chamber and a medicine chamber, at least one needle attached to the needle plug, and a pressure reacting member positioned adjacent the needle and responsive to pressure placed on the pressure reacting member;

charging the syringe with medication;

pressurizing the air pressure chamber;

contacting the animal with the needle;

maintaining the needle plug stationary with respect to the syringe and moving the needle in relation to the barrel in response to contact of the needle with the animal;

commencing injecting medication into the animal through the needle; and moving the plunger piston in response to the pressurized air chamber causing the plunger piston to contact the needle and displacing the needle with respect to the barrel thus evacuating the medication in the medication chamber into the animal.

38. A method, as claimed in claim 37, further including the step of:

manipulating the position of the plunger piston within the barrel thereby allowing recharge of medication within the medication chamber.

39. A method, as claimed in claim 38, wherein:

said manipulating step is achieved by use of a plunger rod which releasably attaches to said plunger piston for placing said plunger piston at a desired location within said barrel.

40. A method, as claimed in claim 37, wherein:

said at least one needle includes a plurality of needles.

41. A method, as claimed in claim 40, further including the step of:

spreading said plurality of needles in response to movement of said pressure reacting member when said needle contacts the animal thereby preventing inadvertent removal of said plurality of needles as medication is injected into the animal.

42. A syringe comprising:

a syringe barrel having an opening extending therethrough, said barrel further having a proximal end and a distal end;

a barrel plug positioned at said proximal end of said syringe barrel;

a needle plug positioned at said distal end of said syringe barrel;

a plunger piston placed within said opening of said barrel and movable within said barrel between said barrel plug and said needle plug, said plunger piston dividing said barrel opening into an air pressure chamber and a medicine chamber;

at least one needle attached to said needle plug, said at least one needle having a passageway formed therethrough enabling flow of medication, said at least one needle having a cylindrical outer surface and a trocar point formed on a distal end of said cylindrical outer surface, said at least one needle further having a transverse needle opening placed adjacent said trocar point on said cylindrical outer surface such that at least some of the medication passing through said needle flows out of said distal needle opening transversely from said trocar point; and a pressure reacting member positioned adjacent said at least one needle, said pressure reacting member enabling said barrel to be movable in response to pressure placed on said pressure reacting member from impact with the animal and in response to pressure placed on said pressure reacting member from said plunger piston.

* * * * *

UNITED STATES PATENT AND TRADEMARK OFFICE
CERTIFICATE OF CORRECTION

PATENT NO. : 6,482,187 B1
DATED : November 19, 2002
INVENTOR(S) : Gibbs

It is certified that error appears in the above-identified patent and that said Letters Patent is hereby corrected as shown below:

Column 11,
Line 27, after "said" delete ".".
Line 53, after "away" delete "-".

Column 14,
Line 33, after "least" delete "-".

Column 15,
Line 42, after "barrel" delete "-".
Line 61, change "pistons" to -- piston --.

Signed and Sealed this

Fourth Day of March, 2003

JAMES E. ROGAN
*Director of the United States Patent and Trademark Office*